(12) United States Patent
Boussant-Roux et al.

(10) Patent No.: US 8,002,861 B2
(45) Date of Patent: Aug. 23, 2011

(54) ABRASIVE GRAIN POWDER

(75) Inventors: Yves Boussant-Roux, Montfavet (FR); Jostein Mosby, Mosby (NO); Ana-Maria Popa, Cavaillon (FR); Arne Menne, Eydehavn (NO); Abhaya Kumar Bakshi, Westfird, MA (US)

(73) Assignee: Saint-Gobain Centre de Recherches et d'Etudes European, Courbevoie (FR)

( * ) Notice: Subject to any disclaimer, the term of this patent is extended or adjusted under 35 U.S.C. 154(b) by 0 days.

(21) Appl. No.: 12/865,554

(22) PCT Filed: Feb. 6, 2009

(86) PCT No.: PCT/FR2009/050186
§ 371 (c)(1),
(2), (4) Date: Jan. 12, 2011

(87) PCT Pub. No.: WO2009/101339
PCT Pub. Date: Aug. 20, 2009

(65) Prior Publication Data
US 2011/0100346 A1    May 5, 2011

(30) Foreign Application Priority Data

Feb. 7, 2008  (FR) ..................... 08 50776

(51) Int. Cl.
*B24D 3/00*  (2006.01)
*B24D 11/00*  (2006.01)
*B24D 1/00*  (2006.01)
*B24B 1/00*  (2006.01)
*C09K 3/14*  (2006.01)
*C09C 1/68*  (2006.01)

(52) U.S. Cl. ................ 51/307; 51/293; 51/295; 51/309; 451/28

(58) Field of Classification Search .................... 51/293, 51/295, 307, 309; 451/28
See application file for complete search history.

(56) References Cited

U.S. PATENT DOCUMENTS
5,937,844 A    8/1999  Kiuchi et al.
2006/0249134 A1  11/2006  Kawasaki et al.

FOREIGN PATENT DOCUMENTS
EP       0 395 088 A2    10/1990
JP       A-10-180608     7/1998
JP       A-2003-041240   2/2003
WO       WO 2005/095076 A1  10/2005

OTHER PUBLICATIONS

International Search Report issued in International Patent Application No. PCT/FR2009/050186 mailed Aug. 27, 2009 (with translation).
Written Opinion of the International Searching Authority issued in International Application No. PCT/FR2009/050186 on Aug. 27, 2009 (with translation).

*Primary Examiner* — Anthony J Green
*Assistant Examiner* — Pegah Parvini
(74) *Attorney, Agent, or Firm* — Oliff & Berridge, PLC

(57) ABSTRACT

Abrasive grain powder, in particular intended for machining silicon ingots, such that the granulometric fraction $D_{40}$-$D_{60}$ comprises more than 15% and less than 80%, as percentages by volume, of grains having circularity of less than 0.85.

19 Claims, 2 Drawing Sheets

ABRASIVE GRAIN POWDER

FIELD OF THE INVENTION

The present invention relates to an abrasive grain powder, in particular intended for machining silicon ingots, to an abrasive tool, and especially an abrasive wire, including said grains, and to a method of sawing an ingot employing said powder or said abrasive tool.

PRIOR ART

Conventionally, the production of silicon wafers comprises a step of sawing silicon ingots into slices. To this end, the silicon ingots are pushed against an abrasive wire turning in a continuous loop and being recharged by passing through a slurry containing abrasive grains in suspension.

Methods for sawing silicon ingots and machines that can be used to carry out those methods are described in particular in US 2006/249134, U.S. Pat. No. 5,937,844, and WO 2005/095076.

The silicon wafers may be intended for electronics applications or for the production of photovoltaic cells. In particular for photovoltaic cells, there exists a need for producing silicon wafers of small thickness, of the order of 200 µm [micrometer], in order to limit the quantity of silicon required to produce one watt.

There is also a need for high sawing rates in order to augment productivity.

However, these constraints of thinness and high sawing rate result in unsatisfactory rejection rates. A large proportion of the wafers produced exhibit variations in thickness along their length, deformations or defects at their surface. Certain wafers even have incipient cracks or are shattered during sawing.

Research has thus been undertaken in order to improve the performance of the slurries employed. In particular, JP 10-180 608 recommends the use of abrasive grains in the form of platelets of thickness equal at most to one fourth of their length and width.

JP 2003-041240 recommends a narrow grain size dispersion about the median size. JP 2003-041240 also states that the mean aspect ratio must be 0.59 or higher. The grains disclosed in JP 2003-041240 should make it possible to reduce variations in thickness along the wafers that are produced. However, JP 2003-041240 is not concerned with the shape of the grains in a predetermined range of grain sizes.

One aim of the invention is to at least partially overcome one or more of the problems mentioned above, and in particular to improve the productivity of silicon wafer production methods.

SUMMARY OF THE INVENTION

In a first main embodiment, the invention proposes an abrasive grain powder, in particular intended for machining silicon ingots, said powder being such that the $D_{40}$-$D_{60}$ granulometric fraction comprises more than 15% and less than 80%, or even less than 70%, or less than 50%, or less than 40%, as percentages by volume, of grains having circularity of less than 0.85, the $D_{40}$ and $D_{60}$ percentiles being the percentiles of the cumulative granulometric distribution curve of the grain sizes of the powder that correspond to the grain sizes that separate the powder fractions respectively constituted by 40% and 60%, as percentages by volume, from grains of the powder having larger sizes.

As can be seen in more detail in the remainder of the description, the performance of the powder of the invention for sawing ingots is particularly remarkable.

This result is unexplained and surprising.

This is firstly because during a sawing operation, the coarsest grains are the primary attackers of the ingot to be sawn. The skilled person would thus be incited to favor elongating the grains for the granulometric fractions corresponding to the largest grain sizes, without imagining that the presence of a large quantity of elongate grains in the intermediate granulometric ranges would be able to improve the performance of the powder.

Secondly, the inventors have discovered that, in contrast to the teaching of JP 10-180 608, the quantity of elongate grains in said intermediate granulometric fractions must be limited. A mixture of elongate grains and round grains is advantageous to proper stacking and to a distribution profile that is adapted to the elongate grains, especially in an application to an abrasive tool, in particular on a support wire. Wear on the abrasive tool is also more homogeneous.

In a second main embodiment, the invention proposes an abrasive grain powder, intended in particular for machining silicon ingots, said powder being such that the ratio of the percentage by volume $S(D_{40}\text{-}D_{60})$ of grains having circularity of less than 0.85 in the $D_{40}$-$D_{60}$ granulometric fraction divided by the median diameter $D_{50}$, or "$R_{40\text{-}60}$ ratio", is greater than 0.85 and less than 3.5, preferably less than 2, or even less than 1.5, the circularity and the percentiles being as defined above.

This ratio may be greater than 0.9, greater than 1.0, greater than 1.1, greater than 1.2, or even greater than 1.3.

An abrasive grain powder in accordance with the second main embodiment of the invention may incorporate one or more of the necessary or optional characteristics of an abrasive grain powder according to the first main embodiment.

In a third main embodiment, the invention proposes an abrasive grain powder in particular intended for machining silicon ingots, said powder being such that:

10%<$\Delta_{3\text{-}10\text{-}20}$<60%; and/or
15%<$\Delta_{10\text{-}20\text{-}40}$<60%; and/or
10%<$\Delta_{20\text{-}40\text{-}60}$<30%; and/or
15%<$\Delta_{40\text{-}60\text{-}80}$<40%; and/or
17%<$\Delta_{60\text{-}80\text{-}97}$<50%;

"$\Delta_{n\text{-}m\text{-}p}$" being the ratio $(S(D_n\text{-}D_m)\text{-}S(D_m\text{-}D_p))/S(D_m\text{-}D_p)$ as a percentage; and "$S(D_i\text{-}D_j)$" being the percentage by volume of grains having circularity of less than 0.85 in the granulometric fraction $D_i$-$D_j$.

In one embodiment:
10%<$\Delta_{20\text{-}40\text{-}60}$<30%; and/or
15%<$\Delta_{40\text{-}60\text{-}80}$<60%, or even $\Delta_{40\text{-}60\text{-}80}$<40%; preferably
10%<$\Delta_{20\text{-}40\text{-}60}$<30%; and
15%<$\Delta_{40\text{-}60\text{-}80}$<60%, or even $\Delta_{40\text{-}60\text{-}80}$<40%.

In one embodiment:
15%<$\Delta_{10\text{-}20\text{-}40}$<60%, or even $\Delta_{10\text{-}20\text{-}40}$<50%.

In one embodiment:
15%<$\Delta_{10\text{-}20\text{-}40}$<60%, or even $\Delta_{10\text{-}20\text{-}40}$<50%; and
15%<$\Delta_{40\text{-}60\text{-}80}$<60%, or even $\Delta_{40\text{-}60\text{-}80}$<40%.

In one embodiment:
10%<$\Delta_{3\text{-}10\text{-}20}$<60%; and
15%<$\Delta_{10\text{-}20\text{-}40}$<60%; and
10%<$\Delta_{20\text{-}40\text{-}60}$<30%; and
15%<$\Delta_{40\text{-}60\text{-}80}$<40%; and
17%<$\Delta_{60\text{-}80\text{-}97}$<50%.

$\Delta_{3\text{-}10\text{-}20}$ may be greater than 20%, or even greater than 25% and/or less than 40%, or even less than 30%.

$\Delta_{10\text{-}20\text{-}40}$ may be greater than 20%, greater than 25%, or even greater than 30% and/or less than 50%, or even less than 40% or less than 35%.

$\Delta_{20\text{-}40\text{-}60}$ may be greater than 15%, or even greater than 20% and/or less than 25%.

$\Delta_{40\text{-}60\text{-}80}$ may be greater than 20% and/or less than 35%, or even less than 30% or less than 25%.

$\Delta_{60\text{-}80\text{-}97}$ may be greater than 25%, or even greater than 30% and/or less than 40%, or even less than 35%.

Preferably, several of these conditions are satisfied.

Highly significantly, these conditions can limit variations in the proportion of elongate grains from one granulometric fraction to the next.

As can be seen in more detail in the remainder of the description, prior art grain powder generally has small proportions of elongate grains in the granulometric fractions corresponding to the smallest grains that increase very rapidly in said granulometric ranges. The inventors have discovered that a regular or even substantially linear increase in the proportion of elongate grains from one granulometric range to another can improve the performance of the abrasive grain powder, in particular in silicon ingot sawing applications.

A powder in accordance with the third main embodiment of the invention may also incorporate one or more of the necessary or optional characteristics of the powders according to the first and second main embodiments of the invention.

Regardless of the main embodiment under consideration, still more particularly a grain powder according to the invention may exhibit one or more of the following optional characteristics:

the $D_{20}$-$D_{40}$ granulometric fraction may include more than 10% and/or less than 60%, less than 50%, or even less than 40%, as a percentage by volume, of grains having circularity (S) of less than 0.85;

the $D_{20}$-$D_{40}$ granulometric fraction and/or the $D_{40}$-$D_{60}$ granulometric fraction may include more than 15%, more than 20% and/or less than 35%, as percentages by volume, of grains having circularity of less than 0.85;

the median size $D_{50}$ may be less than 60 µm, 30 µm or 20 µm and/or greater than 3 µm, greater than 5 µm, greater than 8 µm, greater than 12 µm, or greater than 15 µm. The median size $D_{50}$ may also be less than 12 µm. In this case in particular, the $D_{20}$-$D_{40}$ granulometric fraction may include more than 15%, or even more than 20%, as a percentage by volume, of grains having circularity of less than 0.85;

the material of the abrasive grains may have a Vickers $HV_{0.5}$ type microhardness of more than 7 GPa [gigapascals]. This microhardness may be determined by the mean of at least 10 measurements of the impressions made by a diamond point with a square base and a peak angle between the faces equal to 136° applied to a sample of the grains;

the abrasive grains may in particular comprise more than 95% of silicon carbide SIC, as a percentage by weight.

the ratio of the percentage by volume $S(D_{40}\text{-}D_{60})$ of grains having circularity of less than 0.85 in the $D_{40}$-$D_{60}$ granulometric fraction divided by the median diameter $D_{50}$, or "$R_{40\text{-}60}$ ratio", is greater than 0.85, greater than 0.9, greater than 1.0, greater than 1.1, greater than 1.2, greater than 1.3 and/or less than 3.5, preferably less than 2, preferably less than 1.5.

In one particular embodiment, the median size $D_{50}$ is greater than 8 µm and the $D_{40}$-$D_{60}$ granulometric fraction comprises more than 15%, more than 20%, or more than 25%, as a percentage by volume, of grains having circularity of less than 0.85.

The invention also provides a slurry comprising an abrasive grain powder of the invention and a binder, in particular an organic binder, suitable for fixing said grains onto a support, and in particular onto a support wire for sawing ingots, and in particular silicon ingots.

This fixing may be rigid or, in contrast, may in conventional manner allow the grains the opportunity to be mobile relative to one another.

The invention also provides a tool including abrasive grains of the invention fixed on a support or agglomerated with one another, in particular by means of a binder. In particular, the tool may be a support wire coated with a slurry of the invention, for example an abrasive wire intended for sawing ingots, and in particular silicon ingots.

The invention also provides a method of machining an ingot, in particular a method of sawing an ingot using a tool of the invention, and in particular an abrasive wire of the invention. The ingot may comprise more than 50%, more than 80%, more than 90%, more than 95%, more than 99%, more than 99.9%, or even 100% of a constituent selected from a semiconductor material, in particular mono- or poly-crystalline silicon, an arsenide, in particular gallium arsenide (GaAs), indium phosphide (InP), a metallic oxide, or a ferrite. The method may be adapted in order to obtain, when sawing is complete, a wafer with a thickness of less than 200 µm, less than 150 µm, or even 100 µm or less.

The invention also provides a wafer obtained using a machining method of the invention.

Definitions

The term "grain" means an individualized solid substance in a powder or fixed onto a support.

For the sake of clarity, the term "elongate grain" is applied here to a grain having circularity of less than 0.85, and "round grain" is used for a grain with circularity of 0.85 or more.

The term "size" $D_p$ of a grain is applied to the mean of its largest dimension dM and of its smallest dimension dm: (dM+dm)/2.

The "circularity" of a grain is conventionally determined as follows: the grains are taken up in suspension in a fluid in a manner such as to avoid any flocculation of the grains, i.e. any agglomeration. As an example, the inventors have produced a suspension in which a SiC powder was dispersed in water using sodium hydroxide, NaOH.

A photograph of the suspension was taken and processed using a SYSMEX FPIA 3000 type apparatus. In order to evaluate the circularity of a grain, the perimeter $P_d$ of a disk D with an area equal to the area $A_p$ of a grain G on the photograph was determined (see FIG. 2). Further, the perimeter $P_p$ of this grain was determined. The circularity was equal to the ratio $P_d/P_p$. The more elongate the shape of the grain, the lower the circularity.

The instruction manual for the SYSMEX FPIA 3000 also describes this procedure (see "Detailed specification sheets" at www.malvern.co.uk).

Conventionally, the term "cumulative granulometric distribution curve of the grain sizes of the powder" is applied to the granulometric distribution curve providing:

up the ordinate, percentages such that a percentage of p % represents the fraction of the powder having p %, by volume, of larger sized grains; and along the abscissa, the grain sizes $D_p$, $D_p$ being the smallest possible grain size in the powder fraction represented by the percentage p % along the abscissa.

Such a granulometric curve may be produced using a laser granulometer. The SYSMEX FPIA 3000 apparatus can advantageously be used to obtain such curves.

Conventionally, the term "percentile" or "centile" $D_p$ is applied to the grain size (along the abscissa on the curve mentioned above) corresponding to the percentage, by volume, of p % along the abscissa. As an example, 10%, by volume, of the grains of the powder have a size of $D_{10}$ or more and 90% of the grains, by volume, have a size of strictly less than $D_{10}$.

The term "$D_p$-$D_q$" denotes the granulometric fraction comprising the set of grains having a size of $D_q$ or more and $D_p$ or less.

The term "$S(D_p$-$D_q)$" denotes the percentage by volume of elongate grains in the granulometric fraction $D_p$-$D_q$.

The term "$\Delta_{n\text{-}m\text{-}p}$" denotes the ratio $(S(D_n\text{-}D_m)\text{-}S(D_m\text{-}D_p))/S(D_m\text{-}D_p)$ as a percentage. As an example, $\Delta_{3\text{-}10\text{-}20}=(S(D_3\text{-}D_{10})\text{-}S(D_{10}\text{-}D_{20}))/S(D_{10}\text{-}D_{20})$. $\Delta_{n\text{-}m\text{-}p}$ thus indicates the increase in the proportion of elongate grains of the granulometric fraction $D_n$-$D_m$ relative to the granulometric fraction $D_m$-$D_p$.

BRIEF DESCRIPTION OF THE FIGURES

Other characteristics and advantages of the invention become further apparent from the following description and from the drawings, in which.

DETAILED DESCRIPTION

Production Method

Figure 1:
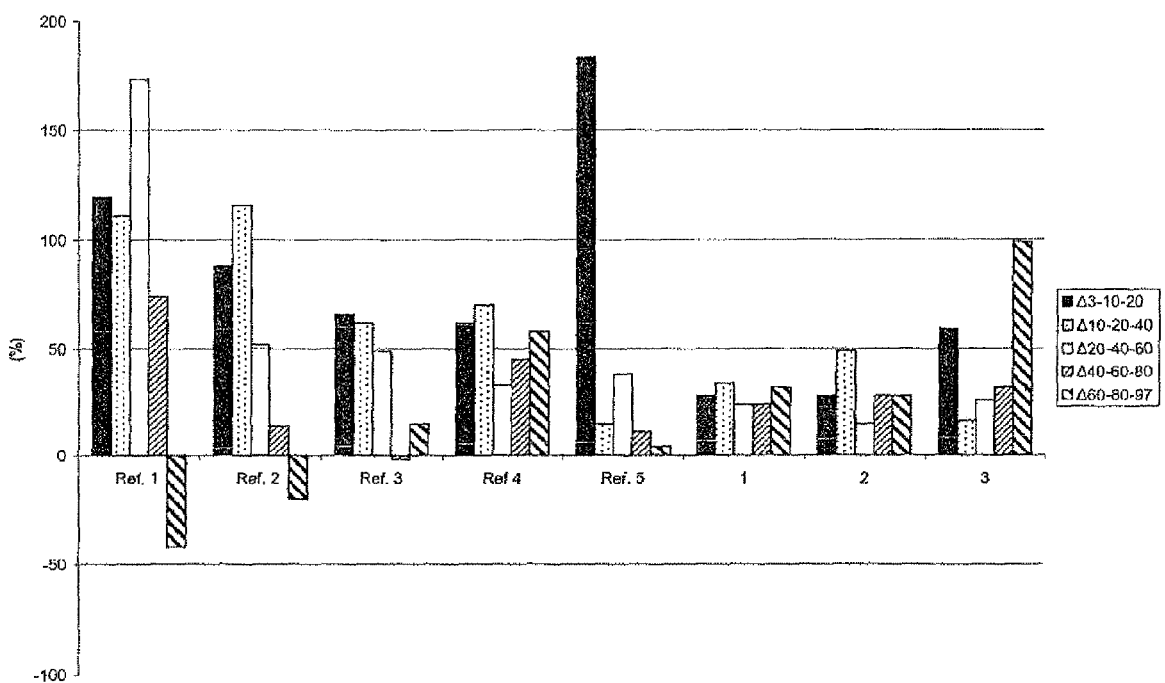
FIG. 1 represents the change from one granulometric fraction to the next of the proportion of elongate grains for various test powders.
Figure 2:
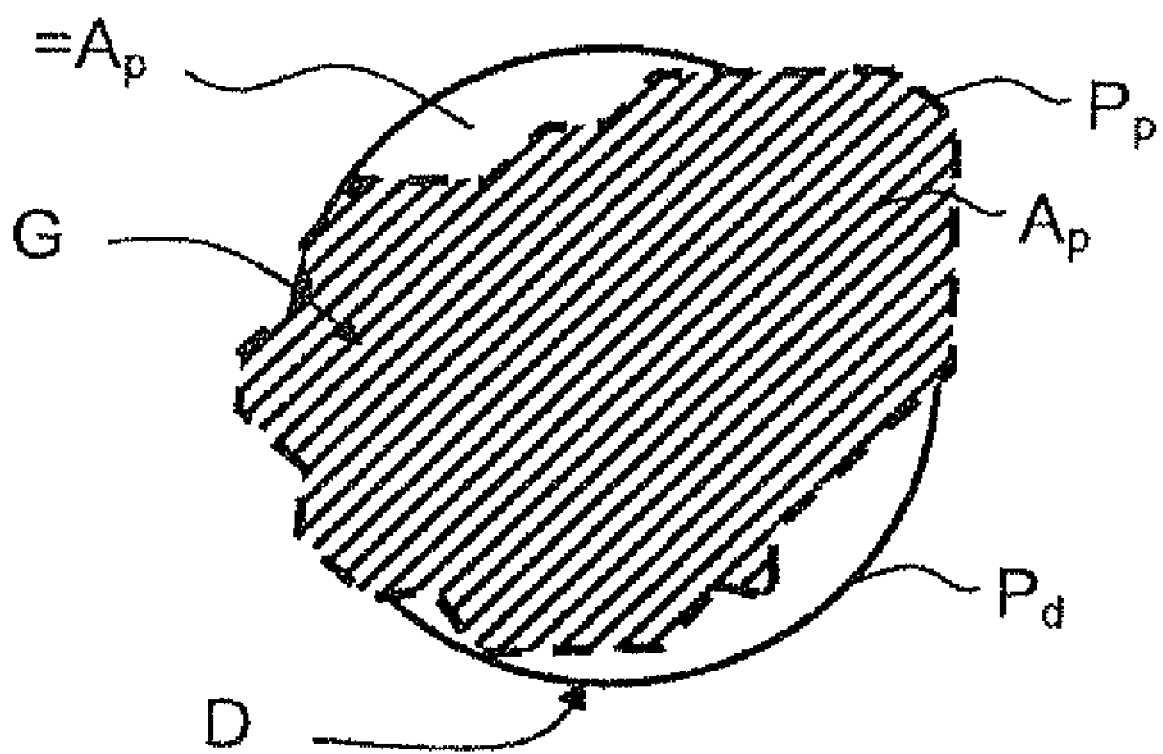
FIG. 2 illustrates the method used to determine the circularity of grains.

Any known method of producing abrasive grains may be used in order to produce round grains and elongate grains. To produce elongate grains, reference should in particular be made to JP 2003-041240.

Depending on the proportion of elongate grains produced, steps of classification, sorting, for example by screening, or mixing various granulometric fractions may be necessary in order to obtain proportions of elongate grains corresponding to those of a powder of the invention.

A powder of the invention may, for example, be produced using a method comprising at least the following steps:

a) synthesizing a solid body that is preferably at least millimetric, i.e. with all of its dimensions exceeding at least 1 mm [millimeter], preferably by reaction, in particular by carboreduction, for example carboreduction of silica in order to produce silicon carbide (SiC), isostatic pressing ("IP"), hot isostatic pressing ("HIP"), SPS ("Spark Plasma Sintering"), or by fusion, in particular by electrofusion.

b) optional reduction of said solid body into a set of particles, possibly by crushing;

c) preferably, selecting, as an example by screening, particles with a size greater than the maximum grain size $D_{0.5}$ of the powder to be produced and, preferably, selecting particles with a size at least twice said maximum size and/or less than 4 times said maximum size;

d) milling the solid body obtained in step a) or particles obtained in step b) or in step c), preferably under conditions that favor shear stresses, in particular using a roller grinding mill;

e) if appropriate, selecting grains derived from step d) and falling into predetermined granulometric ranges so that the powder obtained is in accordance with the invention;

f) optional magnetic separation in order to eliminate any magnetic particles introduced during the milling carried out in step d);

g) optional heat or chemical treatment in order to eliminate unwanted chemical species, for example silica or an excess of carbon with a silicon carbide powder (SiC); and h) optionally, verifying the quality of the powder, preferably by sampling.

In step a), the aim is to produce solid bodies with sufficient strength to "burst" during milling. In other words, the prepared solid bodies must not be simple agglomerations of grains that can crumble during milling, since such crumbling could not produce sufficient elongate grains for industrial use. Any synthesis method may be envisaged; simple tests enable the most favorable conditions to be determined.

In optional step b), the solid bodies are reduced, for example crushed, in order to augment the quantity of particles that are capable of being selected during optional step c).

Step c), which is optional, is intended to ensure that after the particles introduced into the mill have burst, the sizes of the grains obtained at the outlet from the mill are sufficient for the powder to remain fairly coarse.

To this end, it is preferable for the minimum size of the solid bodies or the particles entering the mill to be at least twice the maximum size of the grains of the powder to be produced.

In step d), a mill that favors shear stresses is used, preferably a roller grinding mill.

Attrition mills are not suitable for effective production of a large quantity of elongate grains.

With a roller grinding mill, the separation of the rollers may be adjusted so that the milled powder is a powder in accordance with the invention.

An additional step e), which is optional if the powder obtained at the end of step d) is in accordance with the invention, may then be carried out in order to select preferred granulometric ranges. This step may include a classification, preferably by elutriation, i.e. by separation according to density by agitation in water. This technique is highly suitable for the fine granulometry of the grains of a powder of the invention.

An optional step f) may also be carried out in order to eliminate magnetic particles, in particular those introduced during step d), by magnetic separation. Preferably, this step is carried out using a high intensity magnetic separator.

If necessary, in an optional subsequent step h), the quality of the powder obtained following milling is checked, preferably by sampling, for example using a microscope, a scanning electronic microscope, or using any known means for inspecting the shape of the grains.

At the end of this method, a powder of the invention is obtained.

Powder

Regardless of which main embodiment is envisaged, a powder of grains of the invention may have one or more of the characteristics described below, insofar as said characteristics are not incompatible with the main embodiment in question.

The abrasive grains are preferably formed from a material with Vickers microhardness, $HV_{0.5}$, greater than 7 GPa.

The nature of the abrasive grains may in particular be that of the abrasive grains used until now as polishing or sawing materials. In particular, the grains may be formed from a material selected from the group constituted by silicon carbide, cerium oxide, diamond, boron nitride, alumina, zirconia, silica, and combinations of one or more of these materials. Such abrasive grains are commercially available. Examples that may be mentioned are GC™ (Green Silicon Carbide) and C™ (Black Silicon Carbide) silicon carbide produced by FUJIMI Inc or SIKA™ produced by Saint-Gobain Materials in Lillesand, Norway. The alumina powders may, for example, be selected from FO (Fujimi Optical Emery), A (Regular Fused Alumina), WA (White Fused Alumina) and PWA (Platelet Calcined Alumina) produced by FUJIMI Inc.

Grains of silicon carbide are particularly advantageous.

In a preferred embodiment, the abrasive grains comprise more than 95% silicon carbide, as a percentage by weight. The last 2.5% may be impurities. The term "impurities" means unavoidable constituents necessarily introduced with the starting materials during production of the grains. In particular, compounds falling within the group formed by oxides, nitrides, oxynitrides, carbides, oxycarbides, carbonitrides, and metallic species of sodium and other alkalis, iron, vanadium, and chromium are generally impurities. Examples that may be mentioned are $CaO$, $Fe_2O_3$, or $Na_2O$.

The silicon carbide grains preferably have a density of more than 3.0. Preferably, the silicon carbide is crystallized in the alpha form.

In one embodiment, the $D_{20}$ percentile is greater than 9 µm, greater than 11 µm, or even greater than 12 µm and/or less than 15 µm, less than 14 µm, or even less than 13 µm.

The $D_{40}$ percentile may be greater than 10 µm, greater than 15 µm, or even greater than 18 µm or greater than 20 µm and/or less than 25 µm, or even less than 23 µm, or less than 22 µm.

The median size $D_{50}$ may be less than 60 µm, less than 50 µm, less than 40 µm, less than 30 µm, less than 25 µm, less than 20 µm and/or greater than 1 µm, greater than 3 µm, greater than 5 µm, greater than 7 µm, greater than 10 µm, greater than 12 µm, greater than 15 µm, or even greater than 18 µm.

The $D_{60}$ percentile may be greater than 8 µm, greater than 10 µm, greater than 14 µm, or even greater than 16 µm and/or less than 20 µm, or less than 19 µm, or even less than 18 µm.

The $D_{20}$-$D_{40}$ granulometric fraction may include more than 12%, more than 15%, more than 17%, more than 20%, more than 23%, or even more than 25%, as a percentage by volume, of grains having circularity of less than 0.85.

The $D_{40}$-$D_{60}$ granulometric fraction may include more than 17%, more than 20%, more than 23%, or even more than 25%, as a percentage by volume, of grains having circularity of less than 0.85.

In a particular embodiment, the $D_{40}$-$D_{60}$ granulometric fraction comprises more than 17%, or even more than 20%, as a percentage by volume, of grains having circularity of less than 0.85 and the median size is greater than 12 µm, 15 µm, or even 17 µm or 18 µm.

In a particular embodiment, the $D_{20}$-$D_{40}$ granulometric fraction comprises more than 15%, more than 18%, or even more than 20% or more than 21%, as a percentage by volume, of grains having circularity of less than 0.85 and the median size is less than 12 µm, or even less than 10 µm.

In one embodiment, the $D_{20}$-$D_{40}$ granulometric fraction comprises more than 5%, or even more than 6%, as a percentage by number, of grains having circularity of less than 0.85.

In one embodiment, the $D_{40}$-$D_{60}$ granulometric fraction comprises more than 5%, more than 6%, or even more than 7%, more than 8%, more than 10%, or even more than 11% and/or less than 20%, less than 15%, less than 13%, or even less than 12%, as a percentage by number, of grains having circularity of less than 0.85. This feature is of particular application to a powder with a median size $D_{50}$ in the range 12 µm to 20 µm.

However, the inventors have discovered that, in contrast to the teaching of JP 10-180 608, it is not advantageous for all of the grains to have an elongated shape. In particular, in the $D_{20}$-$D_{40}$ or $D_{40}$-$D_{60}$ granulometric fractions, the percentage by volume of grains having circularity of less than 0.85 is preferably limited to 40%.

The percentage by volume of these grains in the $D_{20}$-$D_{40}$ and/or $D_{40}$-$D_{60}$ granulometric fractions may be less than 35%, or even 30%, or even 26%.

The ratio of the percentage by volume S($D_{40}$-$D_{60}$) of grains having circularity of less than 0.85 in the granulometric fraction $D_{40}$-$D_{60}$ to the median diameter $D_{50}$, or "$R_{40\text{-}60}$ ratio", may be greater than 0.85 and less than 2.

When they are used on an abrasive wire, said grains can advantageously limit the deformation and tension of the wire.

This ratio may be greater than 0.9, greater than 1.0, greater than 1.1, greater than 1.2, greater than 1.3, or even greater than 1.4.

In one embodiment, this ratio may be less than 1.4.

Slurry

A powder of the invention may in particular be used to produce a slurry.

A slurry conventionally comprises an abrasive grain powder in suspension in a liquid or paste binder. The binder may in particular be an organic binder. The binder generally comprises water, a base material, and one or more additives.

The quantity of water is preferably in the range 10% to 75% by weight relative to the weight of the slurry.

The base material may be selected from alkali metal hydroxides, such as lithium hydroxide, sodium hydroxide or potassium hydroxide, alkaline-earth hydroxides, such as magnesium hydroxide, calcium hydroxide, or barium hydroxide, and combinations of these various materials. The quantity of this base material is conventionally in the range 3.5% to 20% by weight relative to the total mass of liquid in the slurry.

Concerning the additives, in general at least one lubricant is used.

A lubricant may in particular be selected from polyethylene glycol, benzotriazole, oleic acid, and mixtures thereof. One lubricant may, for example, be Rikamultinole produced by Rikashokai or Lunacoolant produced by Daichikagaku. The quantity of lubricant is preferably in the range 0 to 50% by weight relative to the weight of the slurry.

The slurry may be produced simply by mixing the starting materials mentioned above. A method of producing a slurry is in particular described in US 2006/0249134.

Tools

In order to saw silicon ingots, the slurry is conventionally disposed on a support wire at a thickness in the range 0.06 mm to 0.25 mm, for example.

The support wire may in particular be constituted by hard steel or an alloy such as a nickel chromium alloy or an iron nickel alloy or from a metal with a high melting point such as tungsten or molybdenum, or it may be formed from a polyamide fiber.

Machining Method

In a conventional sawing method, as explained in the introduction, an abrasive wire, guided on rollers, turns in a continuous loop, passing through a slurry in order to be recharged with abrasive grains. It rubs on an ingot to be sawn, typically of the order of 200 mm in length and diameter, in order to cut off a slice or "wafer" of that ingot.

The ingot may in particular be an ingot of polycrystalline silicon with a purity of more than 99.99% by weight.

In accordance with one implementation of the machining method of the invention, the wafer is sawn so that it has a thickness of less than 200 µm, less than 180 µm, less than 150 µm, less than 130 µm, less than 120 µm, or even less than 100 µm.

Tests

Various mixtures of silicon carbide grains have been tested.

Table 1 below provides the values for the various percentiles of these various mixtures.

TABLE 1

| Percentile (μm) | Example |  |  |  |  |  |  |  |
|---|---|---|---|---|---|---|---|---|
|  | 1 | Ref. 1 | 2 | Ref. 2 | 3 | Ref. 3 | Ref. 4 | Ref. 5 |
| $D_{97}$ | 10.1 | 12.0 | 6.7 | 7.6 | 4.9 | 5.8 |  |  |
| $D_{80}$ | 14.3 | 15.1 | 10.4 | 10.1 | 7.4 | 8.5 |  |  |
| $D_{60}$ | 17.0 | 16.6 | 12.8 | 21.0 | 9.0 | 10.1 | 7.0 | 7.2 |
| $D_{50}$ | 19.2 | 17.6 | 14.4 | 12.9 | 9.6 | 10.8 | 7.6 | 7.6 |
| $D_{40}$ | 21.0 | 19.3 | 15.3 | 13.6 | 10.5 | 11.8 | 8.4 | 8.35 |
| $D_{20}$ | 26.6 | 23.0 | 19.4 | 15.8 | 12.6 | 13.7 | 0.0 | 10.0 |
| $D_{10}$ | 32.6 | 27.5 | 23.1 | 17.8 | 14.2 | 15.4 | 11.6 | 11.2 |
| $D_3$ | 51.8 | 42.4 | 29.1 | 21.4 | 18.9 | 27.5 | 13.5 | 20.6 |

Table 2 provides, for these mixtures, the percentages by volume of elongate grains 8% in the various granulometric ranges.

TABLE 2

| | S % |  |  |  |  |  |  |  |
|---|---|---|---|---|---|---|---|---|
| | 1 | Ref. 1 | 2 | Ref. 2 | 3 | Ref. 3 | Ref. 4 | Ref. 5 |
| $D_{80}$-$D_{97}$ | 15.5 | 5.4 | 12.9 | 7.3 | 6.6 | 7.7 | | |
| $D_{60}$-$D_{80}$ | 20.4 | 3.1 | 16.6 | 5.9 | 13.2 | 8.8 | | |
| $D_{40}$-$D_{60}$ | 25.4 | 5.4 | 21.2 | 6.7 | 17.4 | 8.7 | 12.2 | 4.6 |
| $D_{20}$-$D_{40}$ | 31.5 | 14.9 | 24.4 | 10.2 | 21.9 | 12.9 | 37.5 | 20.9 |
| $D_{10}$-$D_{20}$ | 42.3 | 31.4 | 36.4 | 22.0 | 25.4 | 20.9 | | |
| $D_3$-$D_{10}$ | 54.0 | 69.0 | 46.7 | 41.2 | 40.3 | 34.7 | 16.3 | 6.4 |

Table 3 provides, for the test mixtures, the percentage by number of the elongate grains N % in certain granulometric ranges.

TABLE 3

| Example | Fraction | N % |
|---|---|---|
| 1 | $D_3$-$D_{10}$ | 1.4 |
|  | $D_{20}$-$D_{40}$ | 5.5 |
|  | $D_{40}$-$D_{60}$ | 11.6 |
| Ref. 1 | $D_3$-$D_{10}$ | 2.6 |
|  | $D_{20}$-$D_{40}$ | 7.2 |
|  | $D_{40}$-$D_{60}$ | 14.8 |
| 2 | $D_3$-$D_{10}$ | 1.1 |
|  | $D_{20}$-$D_{40}$ | 4.6 |

TABLE 3-continued

| Example | Fraction | N % |
|---|---|---|
|  | $D_{40}$-$D_{60}$ | 7.9 |
| Ref. 2 | $D_3$-$D_{10}$ | 3.0 |
|  | $D_{20}$-$D_{40}$ | 8.9 |
|  | $D_{40}$-$D_{60}$ | 12.9 |
| 3 | $D_3$-$D_{10}$ | 1.8 |
|  | $D_{20}$-$D_{40}$ | 6.9 |
|  | $D_{40}$-$D_{60}$ | 10.4 |
| Ref. 3 | $D_3$-$D_{10}$ | 2.4 |
|  | $D_{20}$-$D_{40}$ | 6.6 |
|  | $D_{40}$-$D_{60}$ | 12.0 |
| Ref. 4 | $D_3$-$D_{10}$ | 0.8 |
|  | $D_{20}$-$D_{40}$ | 6.4 |
|  | $D_{40}$-$D_{60}$ | 10.5 |
| Ref. 5 | $D_3$-$D_{10}$ | 0.85 |
|  | $D_{20}$-$D_{40}$ | 5.8 |
|  | $D_{40}$-$D_{60}$ | 10.8 |

The reference examples Ref.1, Ref.2, Ref.3, Ref.5 are mixtures sold by Saint-Gobain Materials under the trade name SIKA and with references F500, F600, F800, and F1000, respectively.

Slurries were then prepared from these various powders in a manner similar to that of the example described in JP 2003-041240. The proportion was 1 kg [kilogram] of SiC for 1 L [liter] of PEG type polyethylene glycol with a molecular mass of 200. The slurries were then used to saw a silicon ingot in accordance with the protocol described in the example of JP 2003-041240.

The rate of machining the silicon ingot by the abrasive wire (which rubs on the ingot in a plane perpendicular to the direction of advance of the silicon ingot), i.e. the number of ingots sawn per unit of time, was measured each time under the same conditions.

The rates obtained with the slurries produced from powders 1, 2, and 3 were compared with the rates obtained with the slurries produced from abrasive powders "Ref.1", "Ref.2", and "Ref.3", respectively, which were of the same nature and had substantially the same median dimensions as powders 1, 2, and 3, respectively. The ratio between the rate obtained with slurries 1, 2 and 3 and the rate obtained with slurries "Ref.1", "Ref.2" and "Ref.3", termed "gain G'", could in particular allow the impact of the particular granulometric distribution of the powders of the invention at a substantially constant median size to be measured.

The gain G' for examples "Ref.4" and "Ref.5" correspond to comparisons with the results obtained with the example "Ref.3."

The ratio R, equal to S % divided by the median size $D_{50}$, was calculated.

Results

The results obtained are summarized in Table 4 below:

TABLE 4

| Example | Fraction | $D_{50}$ (μm) | N % | S % | R = S %/$D_{50}$ | $R_{40-60}$ = S ($D_{40}$-$D_{60}$)/$D_{50}$ | G' (%) |
|---|---|---|---|---|---|---|---|
| 1 | $D_{40}$-$D_{60}$ | 19.2 | 11.6 | 25.4 | 1.32 | 1.32 | 154 |
| Ref. 1 | $D_{40}$-$D_{60}$ | 17.6 | 14.8 | 5.4 | 0.30 | 0.31 | 100 |
| 2 | $D_{40}$-$D_{60}$ | 14.4 | 7.9 | 21.2 | 1.47 | 1.47 | 156 |

TABLE 4-continued

| Example | Fraction | $D_{50}$ (μm) | N % | S % | R = S %/$D_{50}$ | $R_{40-60} =$ S $(D_{40}-D_{60})/D_{50}$ | G' (%) |
|---|---|---|---|---|---|---|---|
| Ref. 2 | $D_{40}-D_{60}$ | 12.8 | 12.9 | 6.7 | 0.52 | 0.52 | 100 |
| 3 | $D_{40}-D_{60}$ | 9.6 | 6.9 | 17.4 | 1.81 | 1.81 | 112 |
|  | $D_{20}-D_{40}$ |  |  | 21.9 | 2.28 |  |  |
| Ref. 3 | $D_{40}-D_{60}$ | 10.8 | 12.0 | 8.7 | 0.81 | 0.80 | 100 |
|  | $D_{20}-D_{40}$ |  |  | 12.9 | 1.19 |  |  |
| Ref 4 | $D_3-D_{10}$ | 7.6 | 0.8 | 16.3 | 2.14 | 1.60 | 85 |
|  | $D_{20}-D_{40}$ |  | 6.4 | 37.5 | 4.93 |  |  |
|  | $D_{40}-D_{60}$ |  |  | 12.2 | 1.60 |  |  |
| Ref. 5 | $D_3-D_{10}$ | 7.6 | 0.85 | 6.4 | 0.84 | 0.61 | 85 |
|  | $D_{20}-D_{40}$ |  | 5.8 | 20.9 | 2.75 |  |  |
|  | $D_{40}-D_{60}$ |  |  | 4.6 | 0.60 |  |  |

Except for example "Ref. 5", "Ref." indicates that the example is a reference example for the example preceding it in the table. For "Ref. 5", the reference example is example "Ref. 3".

The results obtained show that for median sizes $D_{50}$ of more than 8 μm, the powders of grains in accordance with the invention produce performance that is very substantially superior to that obtained with comparable reference powders. A powder in accordance with the invention can thus allow a high sawing rate, i.e. good productivity, and can also allow wafers, in particular of silicon, to be produced that are very thin, in particular with a thinness of less than 180 μm, or even less than 150 μm, or even of the order of 100 μm, with a low reject rate.

The powder of Example 1 is considered to be preferable overall, the sawing rate being a maximum for this example.

The powders with median sizes $D_{50}$ of less than 8 μm have poorer performance.

Furthermore, the distributions of the elongate grains in the various granulometric fractions of the test powders were compared. While the proportion of elongate grains changes in the same direction when passing from one granulometric range to the next, the inventors have observed, as can be seen in Table 5 below, that this change is much more regular with the powders of the invention.

TABLE 5

| Example | $\Delta_{3-10-20}$ | $\Delta_{10-20-40}$ | $\Delta_{20-40-60}$ | $\Delta_{40-60-80}$ | $\Delta_{60-80-97}$ |
|---|---|---|---|---|---|
| 1 | 28 | 34 | 24 | 24 | 32 |
| Ref. 1 | 120 | 111 | 173 | 74 | −42 |
| 2 | 28 | 49 | 15 | 28 | 28 |
| Ref. 2 | 88 | 116 | 52 | 14 | −20 |
| 3 | 59 | 16 | 26 | 32 | 99 |
| Ref. 3 | 66 | 62 | 49 | −2 | 15 |
| Ref. 4 | 58 | 45 | 33 | 70 | 62 |
| Ref. 5 | 183 | 15 | 38 | 11 | 4 |

FIG. 1 shows these results in the form of a graph.

It appears that the powders of the invention exhibit smaller variations in the amount of elongate grains, in absolute values, than the other powders, in the intermediate granulometric ranges, and in particular for the values for $\Delta_{20-40-60}$. Remarkably, $\Delta_{20-40-60}$ is in particular always less than 30%, or even less than 25%.

The variations in $\Delta_{40-60-80}$ for the powders in accordance with the invention are all in the range 24% to 32%.

The variations in $\Delta_{10-20-40}$ for the powders in accordance with the invention are all in the range 16% to 49%.

As can clearly be seen here, the invention provides a powder of grains that performs particularly well as an abrasive powder, in particular for cutting silicon wafers. With a powder of the invention, it is thus in particular possible to produce photovoltaic cells with a yield in terms of the quantity of electrical energy generated for the quantity of silicon used that is of particular interest.

Clearly, however, the invention is not limited to the embodiments described above, supplied by way of illustrative examples.

In particular, a powdered grain of the invention could be used in applications other than as an abrasive wire. In particular, it could be used to produce other sawing tools or, more generally, other machining tools.

The invention claimed is:

1. An abrasive grain powder, said powder being such that the $D_{40}-D_{60}$ granulometric fraction comprises more than 15% and less than 80%, as percentages by volume, of grains having circularity (S) of less than 0.85, the $D_{40}$ and $D_{60}$ percentiles being the percentiles of the cumulative granulometric distribution curve of the grain sizes of the powder that correspond to the grain sizes that separate the powder fractions respectively constituted by 40% and 60%, as percentages by volume, from grains of the powder having larger sizes.

2. The powder according to claim 1, wherein a ratio, $R_{40-60}$, defined as the percentage by volume $S(D_{40}-D_{60})$ of grains having circularity of less than 0.85 in the $D_{40}-D_{60}$ granulometric fraction divided by the median diameter $D_{50}$ is greater than 0.85 and less than 3.5.

3. The powder according to claim 1, wherein a ratio, $R_{40-60}$, defined as the percentage by volume $S(D_{40}-D_{60})$ of grains having circularity of less than 0.85 in the $D_{40}-D_{60}$ granulometric fraction divided by the median diameter $D_{50}$ is greater than 0.85 and less than 2.0.

4. The powder according to claim 1, wherein:
   10%<$\Delta_{20-40-60}$<30%; or
   15%<$\Delta_{40-60-80}$<60%;
   $\Delta_{n-m-p}$ being the ratio $(S(D_n-D_m)-S(D_m-D_p))/S(D_m-D_p)$ as a percentage;
   $S(D_i-D_j)$ being the percentage by volume of grains having circularity of less than 0.85 in the granulometric fraction $D_i-D_j$.

5. The powder according to claim 1, wherein:
   10%<$\Delta_{20-40-60}$<30%; and
   15%<$\Delta_{40-60-80}$<60%.

6. The powder according to claim 1, wherein the $D_{20}-D_{40}$ granulometric fraction comprises more than 15%, as a percentage by volume, of grains having circularity (S) of less than 0.85.

7. The powder according to claim 1, wherein the $D_{20}-D_{40}$ granulometric fraction and/or the $D_{40}-D_{60}$ granulometric fraction comprises more than 20%, as a percentage by volume, of grains having circularity (S) of less than 0.85.

8. The powder according to claim 1, wherein the $D_{20}-D_{40}$ granulometric fraction and/or the $D_{40}-D_{60}$ granulometric fraction comprises less than 30%, as a percentage by volume, of grains having circularity of less than 0.85.

9. The powder according to claim 1, wherein the median size $D_{50}$ is less than 30 µm.

10. The powder according to claim 9, wherein the median size $D_{50}$ is less than 20 µm.

11. The powder according to claim 1, wherein the median size $D_{50}$ is greater than 3 µm.

12. The powder according to claim 11, wherein the median size $D_{50}$ is greater than 5 µm.

13. The powder according to claim 1, wherein the abrasive grains are formed from a material with a Vickers hardness, $HV_{0.5}$, of more than 7 GPa.

14. The powder according to claim 13, wherein the abrasive grains comprise more than 95% of silicon carbide SiC, as a percentage by weight.

15. The powder according to claim 1, wherein the $D_{40}$-$D_{60}$ granulometric fraction comprises less than 50%, as a percentage by volume, of grains having circularity (S) of less than 0.85.

16. An abrasive wire for sawing blocks, comprising a support wire, a powder according to claim 1 and a binder fixing the grains of said powder onto said support wire rigidly or otherwise.

17. A method of sawing a block based on silicon by means of an abrasive wire according to claim 16, adapted to obtain a wafer with a thickness of less than 200 µm when said sawing is complete.

18. A method according to claim 17, adapted to obtain a wafer with a thickness of less than 150 µm when said sawing is complete.

19. A method according to claim 18, wherein the thickness of the wafer is 100 µm or less.

* * * * *